United States Patent [19]
Klobucar et al.

[11] Patent Number: 5,891,219
[45] Date of Patent: Apr. 6, 1999

[54] TWO STAGE ROTARY CONCENTRATOR

[75] Inventors: Joseph M. Klobucar, Detroit; Ajay Gupta; Dinesh Bhushan, both of Ann Arbor, all of Mich.

[73] Assignee: Durr Environmental, Inc., Plymouth, Mich.

[21] Appl. No.: 6,230

[22] Filed: Jan. 13, 1998

[51] Int. Cl.⁶ .................................................. B01D 53/06
[52] U.S. Cl. ................................. 95/113; 95/115; 96/125; 96/130; 96/144
[58] Field of Search .......................... 95/107, 113–115; 96/123, 125, 130, 143, 144

[56] References Cited

U.S. PATENT DOCUMENTS

| | | | |
|---|---|---|---|
| 2,993,563 | 7/1961 | Munters et al. | 95/113 X |
| 3,708,956 | 1/1973 | Norback | 95/113 X |
| 3,828,528 | 8/1974 | Weil | 96/144 |
| 4,093,435 | 6/1978 | Marron et al. | 96/125 |
| 4,365,979 | 12/1982 | Takeyama et al. | 96/123 |
| 4,402,717 | 9/1983 | Izumo et al. | 96/144 X |
| 4,409,006 | 10/1983 | Mattia | 95/113 |
| 4,701,189 | 10/1987 | Oliker | 95/113 |
| 4,775,484 | 10/1988 | Schmidt et al. | 95/113 X |
| 4,846,855 | 7/1989 | Tsujimoto | 95/113 |
| 4,946,479 | 8/1990 | Izumo | 96/123 |
| 5,158,582 | 10/1992 | Ohitsuka et al. | 95/113 X |
| 5,167,679 | 12/1992 | Maekawa et al. | 96/144 X |
| 5,385,603 | 1/1995 | Sienack | 96/125 |
| 5,464,468 | 11/1995 | Tanaka et al. | 96/125 |
| 5,512,083 | 4/1996 | Dunne | 95/115 X |
| 5,584,916 | 12/1996 | Yamashita et al. | 96/123 |
| 5,659,974 | 8/1997 | Graeff | 95/113 X |

FOREIGN PATENT DOCUMENTS

| | | | |
|---|---|---|---|
| 3902977 | 8/1989 | Germany | 96/125 |
| 2-241516 | 9/1990 | Japan . | |
| 6-031132 | 2/1994 | Japan | 96/125 |
| 2112661 | 7/1983 | United Kingdom . | |

*Primary Examiner*—Robert Spitzer
*Attorney, Agent, or Firm*—Howard & Howard

[57] ABSTRACT

A two stage rotary concentrator takes the gas from the first stage desorption section and passes it back into a second stage concentrator process. A second stage desorption gas is passed over the rotary concentrator in a second stage desorption section. The gas from the second stage desorption section may then be passed for final treatment. The invention greatly reduces the volume of air which must be sent for final treatment.

9 Claims, 1 Drawing Sheet

5,891,219

TWO STAGE ROTARY CONCENTRATOR

BACKGROUND OF THE INVENTION

This invention relates to a rotary concentrator, wherein the volume of polluted air sent for final treatment is drastically reduced compared to the prior art.

The removal of pollutants in industrial air streams has caused the development of many pollution control devices. One commonly used device is a rotary concentrator. A rotary concentrator is basically a rotating adsorbent element. The element can be formed as either a disc or cylinder shape. Known adsorbents such as zeolites, or activated carbon are utilized in the rotating element.

Industrial air streams carrying impurities or pollutants are passed over the disk in a process cleaning stage, and the adsorbent material removes the impurities. A relatively clean air then leaves the disk. As the disk rotates, it passes through a desorption stage. Typically, the desorption stage occurs only over a very limited portion of the rotary cycle for the concentrator. Appropriate ducting blocks the gas to be cleaned from passing over the disk as it moves through the desorption stage. A hot gas is passed over the disk in the desorption stage to remove the impurities which have previously been deposited. Typically, the hot gas moves in the opposed direction over the disk to the direction taken by the gas to be cleaned.

The desorption air removes impurities such that the disk can leave the desorption section relatively clean of impurities. The disk is thus ready to remove additional impurities from gas as it moves out of the desorption stage and back into the process cleaning stage. In some cases the disc is cooled between the desorption and adsorption steps.

The desorption gas which leaves the desorption section carrying the pollutants is then sent to a final treatment stage wherein the pollutants are removed. The final treatment stage typically includes relatively expensive equipment when compared to the cost of the rotary concentrator. By utilizing the rotary concentrator, a much smaller volume of gas must be passed to the final control device.

SUMMARY OF THE INVENTION

The present invention further reduces the volume of gas which must be passed to the final treatment device by passing the desorption air through a second rotary concentrator. In a preferred embodiment, the second stage is performed on the same disk as the first stage. Thus, additional disks are not required. In a most preferred embodiment, the second stage occurs at a radially inner location compared to the location of the first stage. The second desorption stage also occurs over a limited portion of the circumferential extent of the second stage. Heated gas which passes through the first stage desorption section is returned back through the second stage process section. In the second stage process section, the pollutants carried in the desorption gas from the first stage are deposited onto the disk. In the second stage desorption section, those pollutants are removed by heated gas. That heated gas may then be sent for final treatment.

As can be appreciated, the second stage reduces the volume of gas sent for final treatment. As an example, desorption sections typically carry five to twenty percent of the volume of air passed over the process sections. By utilizing the second stage, the total volume of gas that must be sent for final treatment is between 0.25 and 4.0 percent of the total volume of the initial process gas which has been cleaned.

These and other features of the present invention can be best understood from the following specification and drawing, the following of which is a brief description.

BRIEF DESCRIPTION OF THE DRAWING

The sole FIGURE is a schematic view of an inventive system.

DETAILED DESCRIPTION OF A PREFERRED EMBODIMENT

Figure 1:
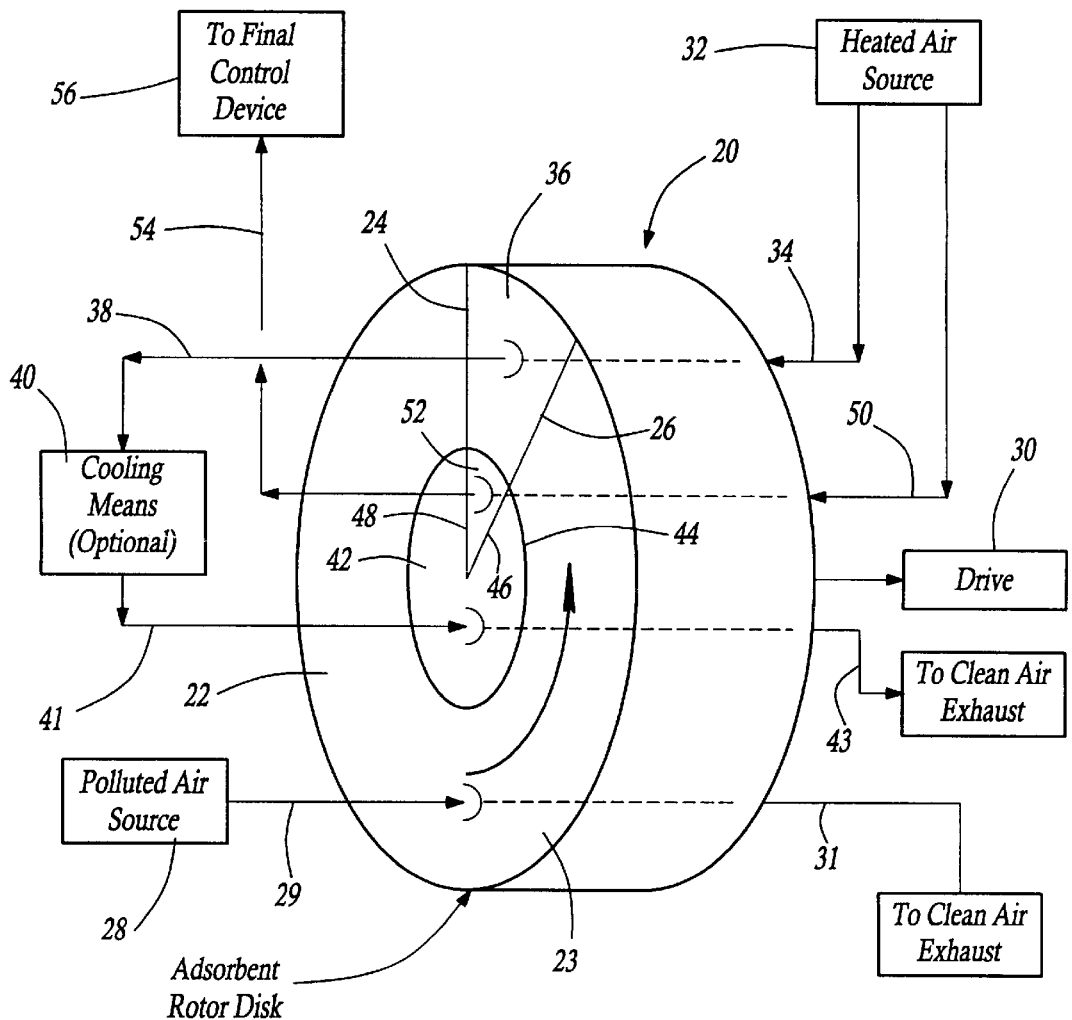

A two stage rotary concentrator 20 is shown in the FIGURE . A process gas section 22 is defined over the majority of the circumference of a radially outer portion of the disk 23. Rotary concentrators are generally known, and thus the FIGURE is shown somewhat schematically. It should be understood that the rotary concentrator includes a rotating disk of material mounted within a fixed frame structure. The fixed frame structure includes ducts such as ducts 24 and 26 which define the outer boundaries of the process section 22. The structure of these ducts is as known in the art, and a worker of ordinary skill in the art would be able to build ducts appropriate for achieving the goals of this invention.

A polluted air source 28 such as an industrial process supplies air through a line 29 to pass over the process section 22. A drive 30 rotates the disk 23, and the gas from source 28 continues to pass over section 22. Gas leaves section 22 at line 31 as clean exhaust air.

A heated air source 32 supplies gas through a line 34 to pass over a desorption section 36. Desorption section 36 is defined by circumferentially spaced ducts 24 and 26. As can be appreciated from this FIGURE , typically the desorption gas passes in an opposed direction to the direction that the process gas passes over disk 23. Thus, the desorption gas removes impurities from the disk which were previously deposited in the process section 22.

In the prior art, gas from the desorption section leaving at line 38 passes to a final control device for final removal of the pollutants. The present invention improves upon that prior art method.

The gas in line 38 may then pass through a cooling section 40. The cooling section 40 is optional, however, efficiencies may be gained by cooling the air prior to passing it back over the second stage process section.

Gas from cooler 40 passes into a line 41 and over a second stage process section 42 defined to be radially inwardly of the first stage process section 22. Preferably, a duct 44 extends circumferentially to separate sections 22 and 42. Again, a worker of ordinary skill in the art would know how to provide appropriate ducting and sealing to achieve this goal. Gas leaving the process section 42 has the impurities removed and passes to line 43 where it is directed as clean exhaust air.

Further ducting 46 and 48 is provided radially inwardly of the ducts 22, 24 and 26 and the duct 44. Gas from the heated source 32 passes through line 50 and over a second stage desorption section 52. The ducting 44 separates second stage desorption section 52 from first stage desorption section 36.

Gas leaving the second stage desorption section 52 passes into line 54 and then to a final control device 56.

As can be appreciated from the FIGURE, the two desorption stages are found at essentially the same circumferential location relative to the axis of rotation of the adsorbent disk. This is the preferred embodiment. Moreover, as can be appreciated, each of the desorption sections extend for equal arcs about the rotational axis.

By utilizing the second stage desorption section, the volume of gas passing through the final control device 56 is drastically reduced when compared to the prior art. Typically, the volume passing through the desorption section is only five to 20% of the total volume flow through the process section. Thus, by utilizing the two stage desorption section much greater efficiencies are achieved. The final control device 56 may be much smaller.

As known, the adsorbent material can be a ceramic base with an appropriate adsorbent material deposited on the base, carbon disks with appropriate material can be layered together to form the overall adsorbent disks, or other known materials may be utilized. Again, the thrust of this invention is not to the basic operation of rotary concentrators, but rather to an improvement providing a two-stage rotary concentrator.

With the present invention, since the volume of air flow entering line 54 will be so small, the final control device can be different from the type typically utilized in rotary concentrators. Typically, a regenerative thermal oxidizer must be utilized. However, with the present invention, since the air flow volume in line 54 will be so small, a condenser for recovery of pollution compounds may be utilized. Typically, condensers are too expensive for the high volumes that leave a rotary concentrator. However, with the present invention the condenser becomes a viable alternative. In addition, since the concentration of pollutants in line 54 will be so high, it may be advisable to utilize an inert gas in line 50 to reduce the possibility of fire or explosion.

Further, as another alternative, a portion or the entirety of the air stream leaving with the adsorbed section 42 may be recombined into line 29. This may potentially improve the overall pollution removal.

A preferred embodiment of this invention has been disclosed, however, a worker of ordinary skill in the art would recognize that modifications would come within the scope of this invention. For that reason, the following claims should be studied to determine the true scope and content of this invention.

We claim:

1. A method of concentrating pollutants from an industrial air stream comprising the steps of:
   (1) providing a first stage rotary concentrator having a rotating adsorbent first disk, defining a desorption section over a small portion of the circumferential extent of said first disk, and providing a second stage rotary concentrator having a rotating adsorbent second disk and a second stage desorption section over a small portion of the circumferential extent of said second disk, said second stage rotary concentrator and said second stage desorption section being provided radially inwardly of said first stage rotary concentrator and said first stage desorption section;
   (2) passing an industrial air stream to be cleaned over said first stage rotary concentrator as said first and second disks rotate;
   (3) passing a desorption gas through said first stage desorption section to remove impurities previously deposited in step (2);
   (4) passing gas from said first stage desorption section over said second stage rotary concentrator to remove impurities; and
   (5) passing gas over said second stage desorption section to remove impurities left in step (4); and then passing gas from said second stage desorption section to a final control device.

2. A rotary concentrator for removing impurities from an industrial air stream comprising:
   (1) a rotating adsorbent disk including a drive for rotating said member, said rotating adsorbent disk rotating through 360 degrees about a rotational axis;
   (2) flow control ducting for defining a first stage rotary concentrator;
   (3) flow control ducting for defining a first stage desorption section over a portion of said circumferential 360 degrees of said adsorbent disk;
   (4) flow control ducting for defining a second stage rotary concentrator radially inwardly of said first stage rotary concentrator;
   (5) flow control ducting for defining a second stage desorption section radially inwardly of said first stage rotary concentrator; and
   (6) fluid lines for communicating a gas from an industrial stream to said first stage rotary concentrator, fluid lines for communicating a desorption gas to said first stage desorption section, a fluid line for communicating gas from said first stage desorption section to said second stage rotary concentrator, and a fluid line for communicating a second stage desorption gas to said second stage desorption section.

3. A rotary concentrator as recited in claim 2, wherein said second stage desorption section is circumferentially aligned with said first stage desorption section.

4. A rotary concentrator as recited in claim 2, wherein said first stage and said second stage desorption sections extend over approximately the same arc in the rotational cycle of said adsorbent disk.

5. A rotary concentrator as recited in claim 2, wherein a cooling structure is provided in said line communicating the outlet of said first stage desorption section to the inlet of said second stage rotary concentrator.

6. A rotary concentrator system comprising:
   (1) a first stage rotary concentrator including an adsorbent rotating disk having a drive for rotating said disk through 360 degrees, said first stage rotary concentrator also being provided with fluid control duct for defining a desorption section over a small portion of the 360 degrees of said rotary concentrator;
   (2) a second stage rotary concentrator including a rotating adsorbent disk and a drive for rotating said adsorbent disk, said second stage rotary concentrator being provided with a fluid control ducting for defining a desorption section over a small portion of said 360 degrees of rotation of said second stage rotary concentrator;
   (3) a fluid line for communicating a gas to be cleaned in said first stage rotary concentrator, a fluid line for communicating a desorption gas to said first stage desorption section, a fluid line for communicating an outlet of said first stage desorption section to said second stage rotary concentrator, and a fluid line for communicating a desorption gas to said second stage desorption section; and
   (4) one of said first and second stage rotary concentrators being positioned radially inwardly of the other.

7. A rotary concentrator as recited in claim 6, wherein said first and second stage rotary concentrators are provided by a single rotating adsorbent disk.

8. A rotary concentrator as recited in claim 7, wherein said second stage rotary concentrator is radially inward of said first stage rotary concentrator.

9. A rotary concentrator as recited in claim 8, wherein said first and second stage desorption sections extend over approximately over the same arc in said 360 degrees of rotation of said adsorbent rotating disk.

* * * * *